No. 892,222. PATENTED JUNE 30, 1908.
R. F. CAREY.
MECHANISM FOR OPENING AND CLOSING DOORS.
APPLICATION FILED SEPT. 9, 1907.
5 SHEETS—SHEET 1.
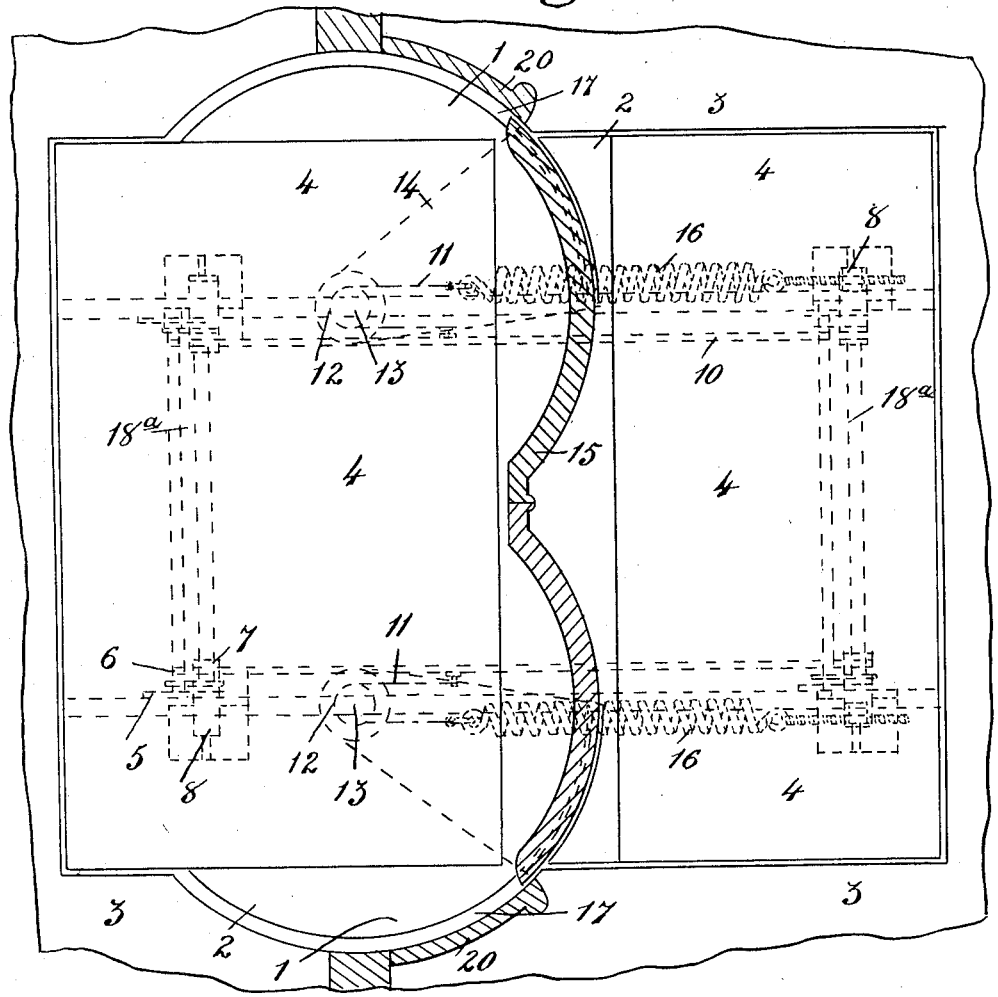
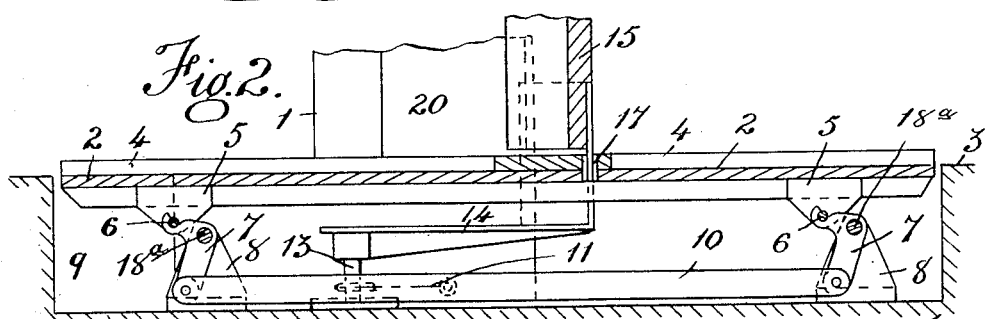

No. 892,222.

PATENTED JUNE 30, 1908.

R. F. CAREY.

MECHANISM FOR OPENING AND CLOSING DOORS.

APPLICATION FILED SEPT. 9, 1907.

5 SHEETS—SHEET 2.

Witnesses:

Inventor
Robert F. Carey
By
James L. Norris

No. 892,222.

PATENTED JUNE 30, 1908.

R. F. CAREY.

MECHANISM FOR OPENING AND CLOSING DOORS.

APPLICATION FILED SEPT. 9, 1907.

5 SHEETS—SHEET 3.

Witnesses:

Inventor
Robert F. Carey
By
James L. Norris
Atty

No. 892,222.  
R. F. CAREY.  
MECHANISM FOR OPENING AND CLOSING DOORS.  
APPLICATION FILED SEPT. 9, 1907.

PATENTED JUNE 30, 1908.

5 SHEETS—SHEET 4.

Witnesses:

Inventor  
Robert F. Carey  
By James L. Norris

No. 892,222.

PATENTED JUNE 30, 1908.

R. F. CAREY.
MECHANISM FOR OPENING AND CLOSING DOORS.
APPLICATION FILED SEPT. 9, 1907.

5 SHEETS—SHEET 5.

Witnesses:

Inventor
Robert F. Carey
By
James L. Norris
Atty.

UNITED STATES PATENT OFFICE.

ROBERT FALKLAND CAREY, OF LONDON, ENGLAND, ASSIGNOR TO JOHN HUGH ARBER, OF LONDON, ENGLAND.

MECHANISM FOR OPENING AND CLOSING DOORS.

No. 892,222.  Specification of Letters Patent.  Patented June 30, 1908.

Application filed September 9, 1907. Serial No. 391,977.

*To all whom it may concern:*

Be it known that I, ROBERT FALKLAND CAREY, a subject of the King of Great Britain, residing at 18 Carlton Terrace, Finchley Road, Childs Hill, London, England, have invented certain new and useful Improvements in Mechanism for Opening and Closing Doors, of which the following is a specification.

The object of my invention is an improved construction of mechanism, whereby a door or doors, will be automatically opened by the weight of a person on a platform on which he steps previous to reaching the door, will remain open while the person is still on the platform, and passing through the doorway, and automatically close after the person has left the platform.

My invention will be clearly understood from the following description aided by the accompanying drawings in which:—

Figure 3:
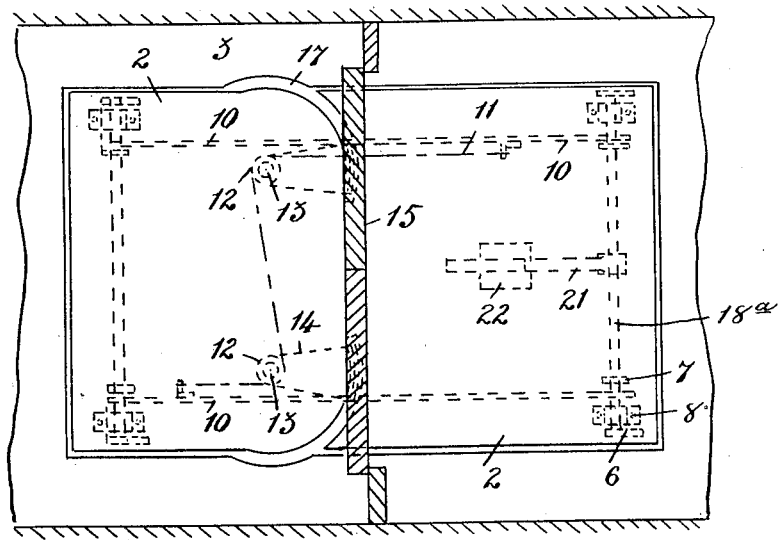
Figure 4:
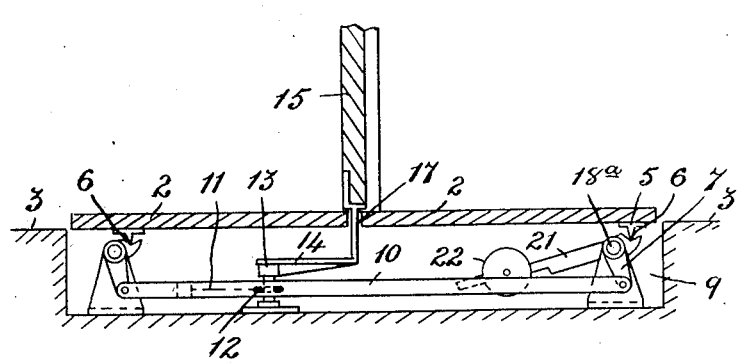
Figure 5:
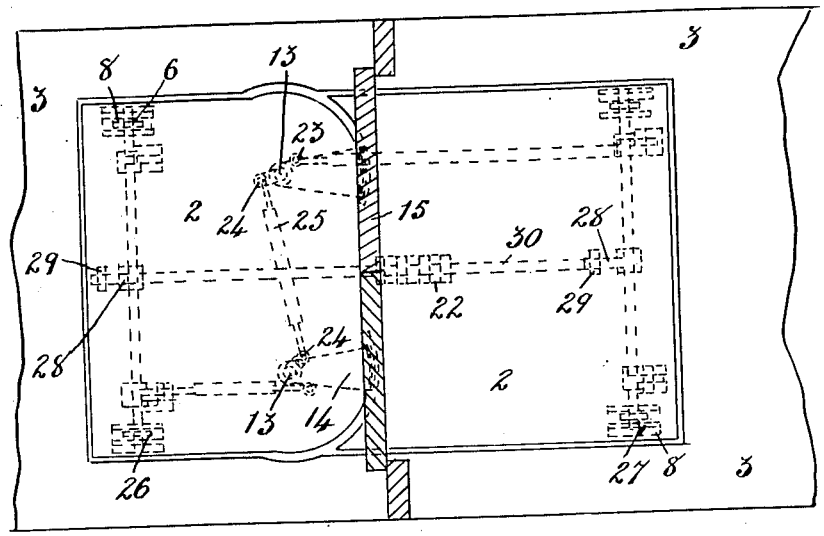
Figure 6:
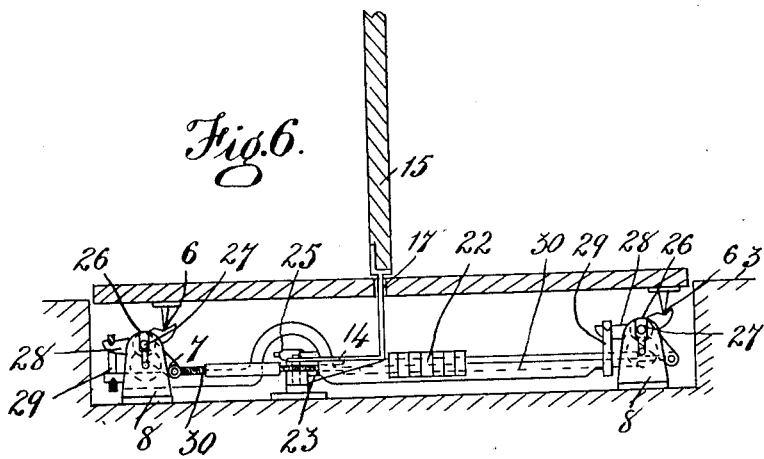
Figure 7:
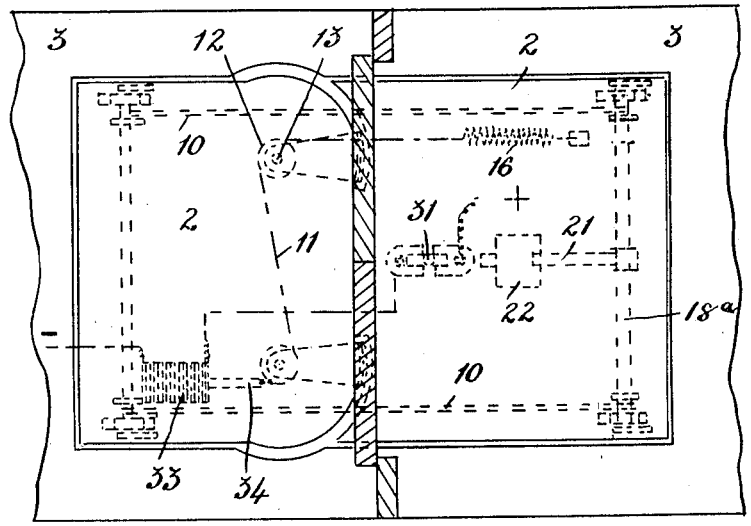
Figure 8:
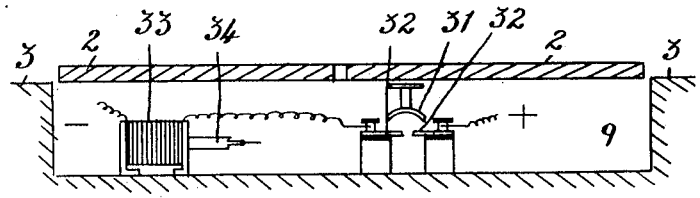
Figure 9:
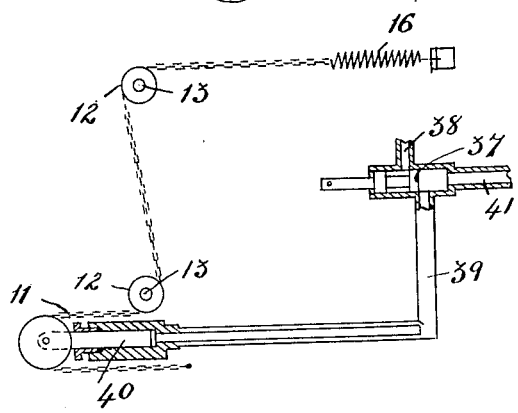
Figure 10:
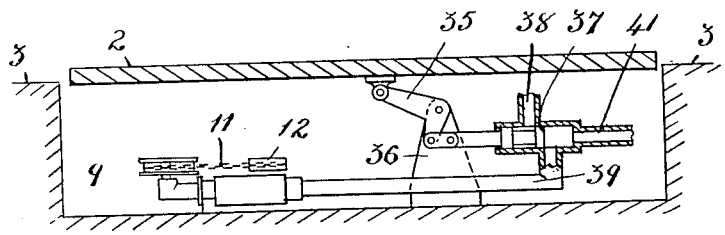

Figure 1. is a plan of a platform and part flooring showing a pair of curved folding doors, and the door posts in section, the mechanism for operating the door being shown in dotted lines. Fig. 2. is a side sectional elevation of same. Fig. 3. is a similar view to Fig. 1, but showing flat doors and with a modified construction of mechanism for operating the doors. Fig. 4. is a side sectional elevation of Fig. 3, but showing a complete sectional edge view of the door and its means of connection to the top rail of the door frame. Fig. 5. is a plan of a platform and part flooring showing a pair of flat folding doors with a further modified construction of mechanism for operating the doors. Fig. 6. is a side sectional elevation of Fig. 5. Fig. 7. is a plan of a platform and part of the flooring with a pair of flat doors in section, the mechanism for operating the door being actuated in one direction electrically by the platform making contact while depressed, a spring returning the door. Fig. 8. is a side sectional elevation with the doors removed. Fig. 9. is a plan of pneumatic or hydraulic mechanism for opening the doors, with a spring to close the doors. Fig. 10. is a side elevation of Fig. 9, showing the platform and part of the flooring.

For the purpose of my invention, and as shown at Figs. 1 and 2, I arrange within and inside and outside a doorway 1 a platform 2, preferably on a level with the flooring 3, or a little raised therefrom, or provided with mats 4 to give a greater height, said platform 2 being provided with lugs 5 carrying pins 6 and being held preferably like a scale beam, on crank levers 7 pivoted to lugs 8 secured to the bottom or sides of the recess 9 formed to receive the platform 2 and the mechanism, each two of the bell crank levers 7 being connected by a rod 10. On each rod I attach a chain 11 which is rove round a pulley 12 formed on pivot 13 of an extension arm 14 from the door 15, on which the door is pivoted, the chain 11 being connected to an adjustable spring 16 connected to one of the lugs 8 or to the recess 9, or to any convenient support.

The bracket or extension 14 on which the bottom of the door is held, extends from the fulcrum or pivot 13 under the platform 2 and passes up through a slot 17 in the platform 2, the door 15 being connected to the portion above the platform, and a similar construction of extension or bracket 18 with the fulcrum 19 in the same plane as the bottom fulcrum 13 is secured to the door at the upper part of the door frame 1, so that the pivot hinges 13 and 19 of the door, see Fig. 4, are central of the circle in which it moves.

When two doors are employed as shown in the drawings, the crank levers 7 are duplicated, and connected together rigidly by a shaft 18$^a$, so that the two rods 10 move together, the springs and chains being also duplicated so that the two doors will move simultaneously, as will be understood from the drawings.

For two or folding doors, I may provide shields 20 on either side of the door post, to form a recess in the door frame, see Fig. 1, for receiving the doors when open, and I may make such doors curved in shape as at Fig. 1 or flat as at Fig. 3.

According to Figs. 3 and 4, I dispense with the springs 16 and substitute an arm 21 carrying weights 22, said arm being fixed to the axle 18$^a$, for effecting the same purpose as the springs, and instead of employing two chains 11, I only employ one, this being affixed to both rods 10, and passed round both pulleys 12 for operating the doors.

According to Figs. 5 and 6, I dispense with the pulleys and chains, and connect to arms 14 on the axle 13 two lugs 23, 24, the lug 23 being connected to the crank lever 7, and the lugs 24 being connected together by an adjustable connecting rod 25. The crank lever 7 instead of being pivoted in bearings of the bracket 8 may be mounted on rollers 26 to reduce friction, and be held in position by slots 27 of the brackets 8.

The axles 18ª are provided with extensions 28, these carrying by links 29 a bar 30, which can be weighted by weights 22 to the desired extent.

In that form of the invention shown in Fig. 7, the operation of the doors is effected by electrical means, the platform in this instance being supported substantially in the manner shown in Figs. 3 and 4, a weight 22 serving to return the platform to elevated position. On the under side of the platform is provided a movable contact 31 which is arranged to coöperate with the stationary contacts 32 and close an electrical circuit through a solenoid 33 when the platform is depressed, the solenoid when energized attracting the movable armature or core 34 and thereby producing a tension on the flexible operating chain or element 11 and causing a simultaneous opening movement of both doors. The moment the platform rises, the circuit through the solenoid is broken by the disengagement of the contacts 31 and 32, and a spring 18 or its equivalent attached to the free end of the chain, serves to automatically return the doors to closed position.

According to Figs. 9 and 10, pneumatic or hydraulic means are employed to open the doors. The platform is connected to a crank arm 35 pivoted to a bracket 36 in the recess, and this crank arm 35 operates a valve 37 which controls the supply of air or liquid from the pipe 38 to the pipe 39 for operating the ram 40 to move the chain 11 to open the doors. When the platform rises, the valve 37 is returned and closes the supply 38, the air or fluid escaping by the pipe 41, this allowing the spring 16, which had previously been put in tension, to act on the chain, return the ram and close the doors.

In action, in accordance with Figs. 1 to 6, a person steps on the platform 2, and his weight lowers same, this actuating the bell cranks 7, one set for each door 15, and moves the two rods end on, this pulls or moves the chain or lugs and opens both doors, the doors moving in a circle, edge on, from their fulcrums or pivots, at the same time the springs are put in tension or the weights raised, the person passes over the platform, and while on the platform, his weight keeps the doors opened, but so soon as he leaves the platform, the springs or weights come into action, and operating the appliances in a reverse direction, close the doors and lift the platform.

According to Figs. 7 and 8, the weight of the person on the platform causes electrical contact to be made, so that the electric current will pass to a magnet to move a solenoid, this pulling the chain which operates the doors, and putting tension on the spring, and as soon as the person leaves the platform, the spring will return the platform and close the doors.

According to Figs. 9 and 10, the operation is the same except that the platform operates a crank, which in turn moves a valve to allow air or water, under pressure, to a ram which operates the chain.

The fulcrum of the doors may be arranged in ball bearings for ease of action.

In all the figures I have shown the platform moving on a parallel motion as this gives equal power at whatever part of the platform a person may stand, but in some cases, more especially where electric pneumatic or hydraulic power is employed, I may make the moving platform hinged on an incline or slope.

In constructing the apparatus, the doors must be made very easy to open, as otherwise the weight of a person on the platform would not be sufficient to open the doors and overcome the resistance of the springs or weight, and by reason of the particular pivoting arrangement of the door, wind pressure will not open the door or doors, as pressure on one side of one door will be neutralized by that on the other side of the same door, and in addition to this advantage, those doors moving in the way described, i. e., in a circle, will not swing in either direction to any great extent towards the face of the person approaching.

What I do claim and desire to secure by Letters Patent is:—

1. In an apparatus of the class specified, a movable platform, the latter having arcuate slots therein, brackets having portions extending through the slots, a door having the lower extremity thereof engaging and carried by the brackets, and mechanism coöperating with the brackets and platform.

2. The combination with a door, of a platform vertically movable in the passage-way controlled by the door and operable by the weight of a person thereon, the platform having arcuate slots therein, brackets having portions thereof connected to the lower edge of the door and projecting through the slots, and operating means between the platform and the brackets for equalizing the movement of the latter when the platform is depressed.

3. The combination with a door, of a platform vertically movable in the passage-way controlled by the doors and having arcuate slots therein, brackets having arms extending through the slots and secured to the lower edge of the doors and also provided with pivots carrying pulleys, a flexible operating means coöperating with the pulleys of the brackets, and mechanism coacting with the platform and operatively engaged by the said flexible means for effecting a uniform opening movement of the doors when the platform is depressed by the weight of a person passing thereover.

4. The combination with movably mounted doors, of a platform arranged in the passage-way controlled by said doors and provided with opposite arcuate slots, arms connected to the lower edges of the doors and extending through the platform and provided with pivots below the platform, pulleys carried by the pivots, supporting devices for maintaining the platform in horizontal position and permitting vertical movement thereof, a flexible operating element engaging the pulleys for effecting simultaneous movement of the doors, and means for restoring the doors to closed position when the platform is free to return to its normal horizontal position.

5. The combination with a pair of coöperating doors, of vertically movable platforms arranged in the passage-way of the doors and extending in front and rear thereof, the one platform having arcuate slots therein, angular brackets having portions extending upwardly through the said slots and secured to the lower edges of the doors and also provided with pivots, pulleys carried by portions of the brackets, movable supporting means arranged beneath and coacting with the platforms and provided with unifying connecting devices, and flexible means engaging the said pulleys and coöperating with the connecting devices.

In testimony whereof I have hereunto set my hand in presence of two subscribing witnesses.

ROBERT FALKLAND CAREY.

Witnesses:
RICHARD CORE GARDNER,
LYNWOOD F. GARDNER.